United States Patent
Kummetz et al.

(10) Patent No.: US 10,523,346 B2
(45) Date of Patent: Dec. 31, 2019

(54) SYSTEM FOR DETERMINING THE LAYOUT AND ABSOLUTE AND RELATIVE POSITIONS OF ELEMENTS IN A DISTRIBUTED ANTENNA SYSTEM AND FOR USE OF THOSE ELEMENTS FOR MEASUREMENT

(71) Applicant: Andrew Wireless Systems GmbH, Buchdorf (DE)

(72) Inventors: Thomas Kummetz, Kissing (DE); Christopher Goodman Ranson, Concord, VA (US); Keld Knut Lange, Oetisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/745,400

(22) PCT Filed: Jul. 15, 2016

(86) PCT No.: PCT/EP2016/066997
§ 371 (c)(1),
(2) Date: Jan. 16, 2018

(87) PCT Pub. No.: WO2017/009479
PCT Pub. Date: Jan. 19, 2017

(65) Prior Publication Data
US 2018/0212692 A1 Jul. 26, 2018

Related U.S. Application Data

(60) Provisional application No. 62/193,394, filed on Jul. 16, 2015.

(51) Int. Cl.
*H04B 17/17* (2015.01)
*G06K 19/077* (2006.01)
(Continued)

(52) U.S. Cl.
CPC ......... *H04B 17/17* (2015.01); *G06K 19/0723* (2013.01); *G06K 19/0773* (2013.01);
(Continued)

(58) Field of Classification Search
CPC ............... H04B 17/17; G06K 19/0723; G06K 19/0773; G06K 19/07773
(Continued)

(56) References Cited

U.S. PATENT DOCUMENTS

2006/0145863 A1* 7/2006 Martin .................. B65D 79/02
340/572.8
2012/0268308 A1* 10/2012 Tuttle .................... G01S 13/282
342/42
(Continued)

FOREIGN PATENT DOCUMENTS

WO 2012083668 A1 6/2012
WO 2015057504 A1 4/2015

OTHER PUBLICATIONS

International Searching Authority, "International Search Report and Written Opinion for PCT Application No. PCT/EP2016/066997", "from Foreign Counterpart to U.S. Appl. No. 62/193,394", dated Oct. 5, 2016, pp. 1-11, Published in: WO.

*Primary Examiner* — Allen T Cao
(74) *Attorney, Agent, or Firm* — Fogg & Powers LLC (57) ABSTRACT

A distributed antenna system including a plurality of remote antenna units, a passive element coupled to at least one of the remote antenna units and an RFID system located proximate the passive element. The RFID system includes processing circuitry and measurement circuitry and the processing circuitry is configured for receiving an interrogation signal and processing the interrogation signal and providing a response. The response includes data associated with a measurement made by the measurement circuitry.

15 Claims, 4 Drawing Sheets

(51) Int. Cl.
*G06K 19/07* (2006.01)
*H01Q 1/22* (2006.01)
*H04W 24/06* (2009.01)
*H04W 88/08* (2009.01)

(52) U.S. Cl.
CPC ..... *G06K 19/07773* (2013.01); *H01Q 1/2216* (2013.01); *H04W 24/06* (2013.01); *H04W 88/085* (2013.01)

(58) Field of Classification Search
USPC .............................................. 340/13.2–13.27
See application file for complete search history.

(56) References Cited

U.S. PATENT DOCUMENTS

| | | | |
|---|---|---|---|
| 2013/0201006 A1 | 8/2013 | Kummetz et al. | |
| 2015/0248569 A1* | 9/2015 | Rushing | G01C 15/04 340/10.34 |
| 2017/0017816 A1* | 1/2017 | Stefanik | G06K 7/10356 |
| 2018/0129841 A1* | 5/2018 | Stefanik | G06K 7/10356 |

* cited by examiner

SYSTEM FOR DETERMINING THE LAYOUT AND ABSOLUTE AND RELATIVE POSITIONS OF ELEMENTS IN A DISTRIBUTED ANTENNA SYSTEM AND FOR USE OF THOSE ELEMENTS FOR MEASUREMENT

CROSS-REFERENCE TO RELATED APPLICATIONS

This application is a National Stage Application of PCT Application No. PCT/EP2016/066997 filed on Jul. 15, 2016, which claims the benefit of U.S. Provisional Patent Application Ser. No. 62/193,394, filed on Jul. 16, 2015, both of which are hereby incorporated herein by reference in their entirety.

FIELD OF THE INVENTION

Embodiments of the invention are directed to wireless communication systems, and specifically directed to a distributed antenna system for wireless communications.

BACKGROUND OF THE INVENTION

Distributed antenna systems (DAS) can be used in confined areas to deploy wireless coverage and capacity to mobile devices. A DAS can include active elements such as master units, extension units, and remote units. Among the variety of active elements, a typical DAS may include passive elements as well. Examples of such passive elements are: coaxial cables, RF splitters, RF combiners, RF antennas, optical fiber, optical splitters, optical combiners, attenuators, dummy loads, cable feeds, and surge protectors. Other passive RF or optical devices can include connectors, jacks, wall jacks, and patch cords.

Systems are presented for detecting the presence of passive RF or passive optical devices that are present in a DAS. The presence of such device can be facilitated through the employment of radio frequency identification (RFID) chips. One aspect includes coupling the RFID chip to the device that is to be detected. In one aspect of such systems, a coupling network is used to couple to a signal wave inside of a waveguide such as coaxial cable, optical fiber or other type of waveguide. Examples of the coupling network are resonant coupling networks, bandpass filters, low pass filters, high pass filters, and directional or non-directional couplers. One purpose of the coupling network is to pass a maximum of RF energy coming from the interrogator or RFID reader to the RFID chip. Another feature of such systems is that they block other signals used in the DAS at different frequencies than the RF interrogator frequency to avoid potential generation of intermodulation products by the potential non-linear characteristic of the RFID chip.

In such systems, a DAS is provided that includes one or more passive elements. Each passive element can be associated with an RFID chip. The RFID chip may be integrated into the passive element or may be coupled, connected, or otherwise associated with the passive element. A reader may be integrated within or otherwise associated with a subsystem of the DAS that is remote from at least some of the passive elements. The reader can transceive RFID signals over a communications network of the DAS. The communications network may include, for example, coaxial cable or another transmission medium that can carry RF signals and RFID signals through the DAS. For example, the reader may transmit an RFID signal that is carried by the communications network through a coupling network to the RFID chip associated with a passive element.

The RFID chip can respond to the RFID signal with a responsive signal representing an identifier of the passive element. The responsive signal can be received from the coupling network and transported by the communications network to the reader. The reader may extract the identifier from the responsive signal and provide the identifier to a controller. The passive element may not be required to be powered for a reader to detect the presence of the passive element. Both the reader and the RFID chip may be configured to be in a fixed position within the DAS, as opposed to the reader being moveable. In other aspects, the reader includes one or more readers that are moveable.

An RFID chip may be any item that can respond to an RFID signal with a responsive signal representing an identifier for the item. An "RFID chip" may also be known as an "RFID tag."

One such system is described in U.S. patent application Ser. No. 13/798,517, filed Mar. 13, 2013 and entitled "Detecting Passive RF Components Using Radio Frequency Identification Tags", which application is incorporated herein by reference in its entirety.

There is a need for such a DAS system that, in addition to determining the existence and layout of various passive elements in a DAS, can further provide measurements of certain features, parameters and passive elements in the DAS.

SUMMARY

One embodiment is directed to a distributed antenna system. The distributed antenna system comprises a plurality of remote antenna units. A passive element is coupled to at least one of the remote antenna units. The distributed antenna system further comprises an RFID system located proximate the passive element. The RFID system includes processing circuitry and measurement circuitry. The processing circuitry is configured for receiving an interrogation signal and processing the interrogation signal and providing a response. The response includes data associated with a measurement made by the measurement circuitry.

Another embodiment is directed to a method for use with a distributed antenna system comprising a plurality of remote antenna units. The method comprising receiving an interrogation signal at an RFID system of the distributed antenna system. The RFID system is proximate a passive element coupled to at least one of the remote antennas of the distributed antenna system. The method further comprises making a measurement by the RFID system based on the interrogation signal and providing, by the RFID system, a response including data associated with the measurement.

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

The present invention provides a system incorporating RFID technology to determine the network presence and layout of the passive devices and to also use RFID technology for measurements in the DAS system. The passive RF elements of the inventive system incorporate RFID systems (chips) that are closely coupled to the otherwise passive RF elements or RF input or output. The RFID systems incorporate measurement devices or elements, including processing circuitry elements, to determine parameters of the interrogation signal or any RF signal, such as RSSI for example. The measurement system is powered by the RFID chip and is either integrated on the RFID system (typically a chip) or is connected and powered by the RFID system. The RFID measurement system receives an interrogator signal or a sequence of interrogator signals and uses the energy to prepare a response. In addition to the regular RFID response including the unique ID, the RFID system of the invention includes measurement results obtained with the measurement system at the location of the RFID system.

The interrogator transceiver may be located at the feed point of the passive DAS and collects the measurement results in a processing system to process, analyze, and make determinations of the layout (interconnectivity and location), the faultless function, the presence of nearby users or interference, plus other information relevant for the operation and maintenance of the passive DAS system.

Figure 1:
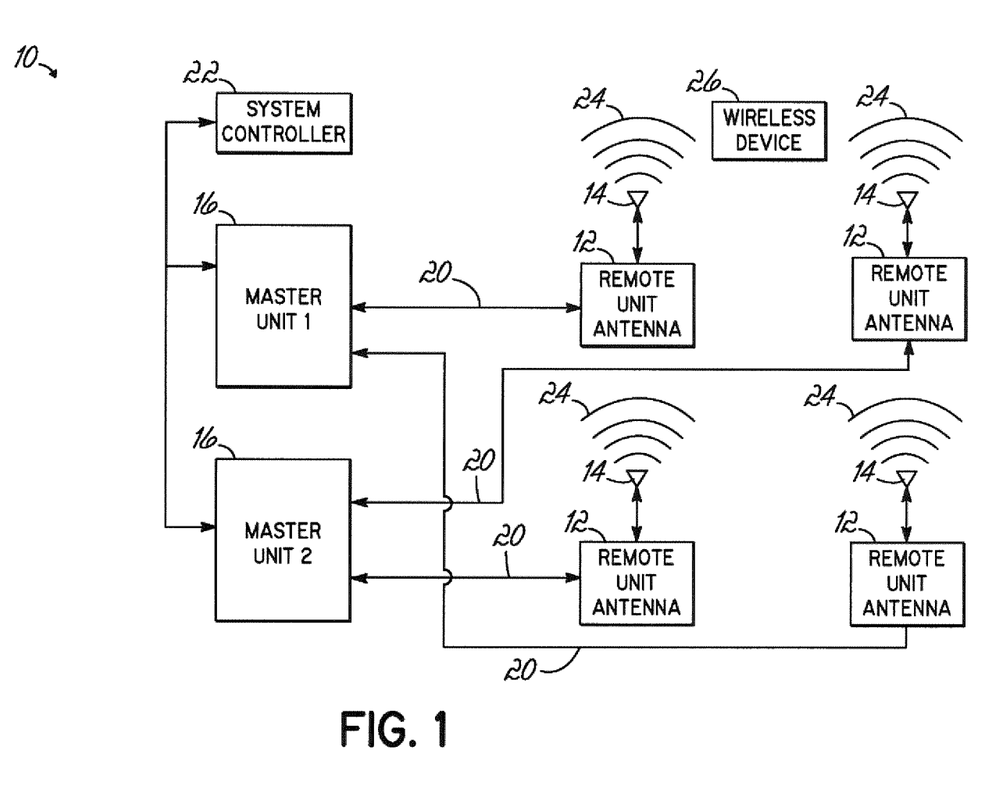
FIG. 1 is a block diagram of a distributed antenna system.

FIG. 1 illustrates a block diagram depicting an embodiment of a DAS for incorporating various aspects of the invention. The DAS 10 can include one or more master units 16 as a donor device that are coupled to one or more remote antenna units 12. The DAS 10 can communicate with one or more base stations or other signal sources (not shown) via a wired or wireless communication medium as appropriate. The DAS and the master units 16 communicate uplink and downlink signals between the base stations and one or more remote antenna units 12 distributed in an environment, such as an indoor environment, to provide coverage within a service area of the DAS 10. The master units 16 can convert downlink signals received from the base station or signal source, such as RF signals, into one or more digital data streams for transmission to the remote antenna units 12. The remote antenna units 12 can convert digital data streams to RF signals. The remote antenna units 12 can amplify the downlink signals and radiate the downlink signals 24 to terminal equipment such as one or more wireless communication devices 26. Uplink signals are handled similarly in the uplink direction and are received from the devices 26 by the remote antenna units 12 and converted from RF to digital data streams and transmitted to the master units 16 and beyond.

A system controller 22 can control the operation of the master units 16 for processing the signals communicated with the remote antenna units 12. The signals communicated with the remote antenna units 12 may be the uplink and downlink signals of the DAS 10 for communicating with terminal equipment. The master units 16 can provide downlink signals to the remote antenna units 12 via the links 20. The links 20 can include any communication medium suitable for communicating data via digitized signals between the master unit 16 and the remote antenna units 12. The digitized signals may be communicated electrically or optically. Non-limiting examples of a suitable communication medium for the links 20 can include copper wire (such as a coaxial cable), optical fiber, and microwave or optical communication links.

Although the DAS 10 is depicted as including a couple master units 16 and remote antenna units 12 coupled to a master unit, any number (including one) of each of master unit 16 and remote antenna units 12 can be used. Furthermore, a DAS 10, according to some aspects, can be implemented without system controller 22.

Figure 2:
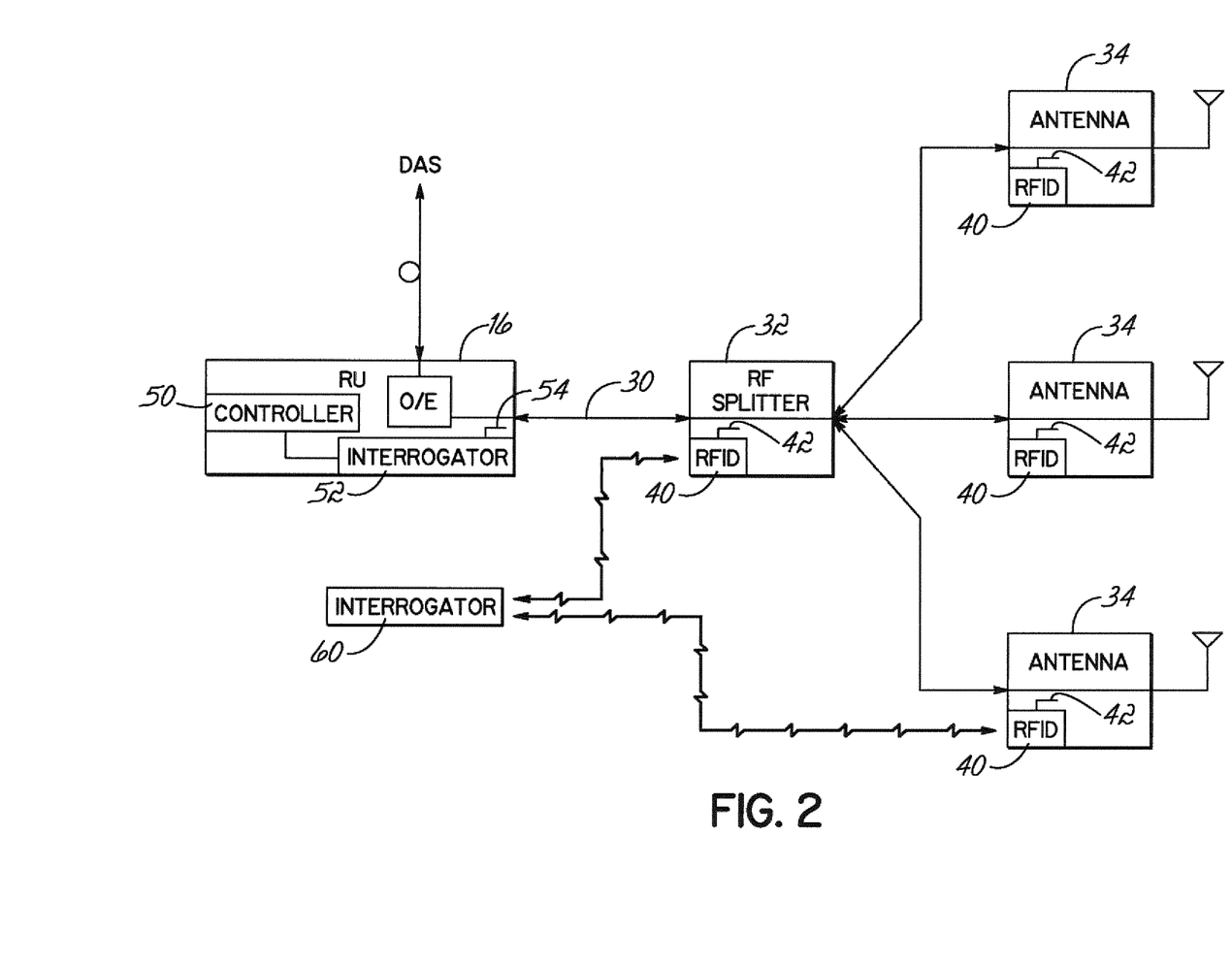
FIG. 2 is a block diagram of passive elements of a distributed antenna system consistent with an embodiment of the invention.

FIG. 2 is a block diagram of an exemplary remote antenna unit 16 configured for performing RFID detection of passive components and system measurements in accordance with aspects of the invention. The remote antenna unit 16 is coupled through an appropriate waveguide, such as a coaxial cable 30, to a splitting device 32, such as an RF splitter, and then to one or more antennas 34. The remote unit 16 uses a plurality of RFID systems 40 to detect the presence of passive RF components and make measurements in accordance with the invention. Each of the passive RF components, such as RF splitter 32 and antennas 34, has an associated RFID system. Each of the RFID systems 40 are coupled to a respective passive component via appropriate coupling circuits 42 (See FIG. 4) or some other suitable coupling circuit or device. Although three antennas 34 are depicted, any number of antennas (including one) can be used.

Each of the RFID systems can include a unique, non-removable, and tamper-proof serial number, similar to an RFID tag and each of the RFID systems 40 can allow the respective passive component to be identified by a system controller 50 that is communication with an RFID interrogator/transceiver 52 or other reader/interrogator system in the remote antenna unit 16. The interrogation process can be initiated by the system controller 50. The system controller 50 can send a command to the RFID interrogator 52 to begin to probe for RFID systems 40 of the passive DAS elements. In some aspects, the RFID interrogator 52 can transmit the probing signal through an appropriate coupling device or current 54. The coupling device 54 can be a directional coupler or a non-directional coupler. In one example, the coupling device 54 can have a coupling ratio of −10 dB or smaller with respect to the coaxial cable 30 in direction to the RFID systems and associated passive elements. In other aspects, the RFID interrogator 52 can transmit the probing signal via a low pass, band pass, or high pass filter.

For coupling the RFID signals in accordance with the invention, various appropriate coupling circuits or devices 42 might be used. For example, an RFID system 40 of a passive element might be coupled to another passive component, such as a coaxial cable 30 or other waveguide, via a resonant coupling circuit 42 that includes an attenuation and matching circuit. One coupling circuit 42 might use a capacitor and an inductor arrangement to have certain resonant characteristics. The resonance frequency can be the operational frequency of the RFID system 40. For frequencies separate from the resonance frequency, the coupling circuit 42 can provide a high impedance to minimize negative impacts from signals used for mobile communication via the DAS 10. Non-limiting examples of negative impacts from signals used for mobile communication can include reflection and loss to other signals on different frequencies. An attenuation and matching circuit can include attenuation devices. Other implementations are also possible. In other aspects, a Balun component, such as (but not limited to) a transformer, can be used in place of the attenuation devices. In additional or alternative aspects, the RFID system of the invention can be coupled to the coaxial cable 30 or another passive component via a non-resonant coupling circuit, such as a directional coupler. The directional coupler can be used with a coupling optimized for signals communicated with the RFID interrogator 52 and selected for suppressing potential intermodulation products generated by the RFID system 40 in the direction of one or more antennas.

For providing interrogation of the RFID systems 40 of the invention, an interrogation signal can be communicated via the coaxial cable 30. The interrogation signal can experience some loss due to the nature of the coaxial cable 30 or other waveguide. One or more of the RFID systems 40 can receive an interrogation signal that has a signal level above a predetermined threshold for the RFID system. Non-limiting examples for such a threshold include signal levels between −15 dBm and −18 dBm. One or more of the RFID tags 40 can receive the interrogation signal via a respective one of the coupling circuits 42. One or more of the RFID systems 40 can then generate a responsive signal. The responsive signal can be communicated back to the RFID interrogator 52 via the coaxial cable or other waveguide.

The DAS 10 may be configured as a low power DAS or a high power DAS. A low power DAS may include remote antenna units having fewer antennas. For a DAS using a low RF power, the RFID interrogator 52 can be included in each remote antenna unit and/or communicate with each remote antenna unit via a central system or devices, such as (but not limited to) the master unit 16 and a network coupling the master unit 16 to each remote antenna unit.

Each RF splitter and antenna or other passive element of a respective remote antenna unit 12 can be equipped with an RFID system. The RFID interrogator 52 can transmit probing signals and receive responsive signals from the RFID systems. The implementation and protocol of the RFID standard can be used to suppress collisions in the responses from RFID tags. An element discovery can show which element and associated RFID system ID is connected to a given remote antenna unit. Periodic probing of the passive components and RFID systems can allow the detection of changes in the installation. Periodic probing of the passive components can additionally be used in accordance with one aspect to make various measurements and also to identify faulty components and devices.

For a high power DAS more antennas are connected to a given remote antenna unit 12 than a low power DAS. More antennas can be connected to a given remote antenna unit 12 by increasing the amount of splitting performed by a splitting device 32. An RFID signal link budget can be evaluated to avoid the RFID interrogator signal being reduced to an insufficiently high level by the splitting. An RFID implementation having a lower loss and a higher link budget may be used.

In some non-limiting embodiments, RFID implementations operating at 100-150 kHz, 13.56 MHz, 860-915 MHz, and potentially 2.4 GHz might be used.

Figure 3:
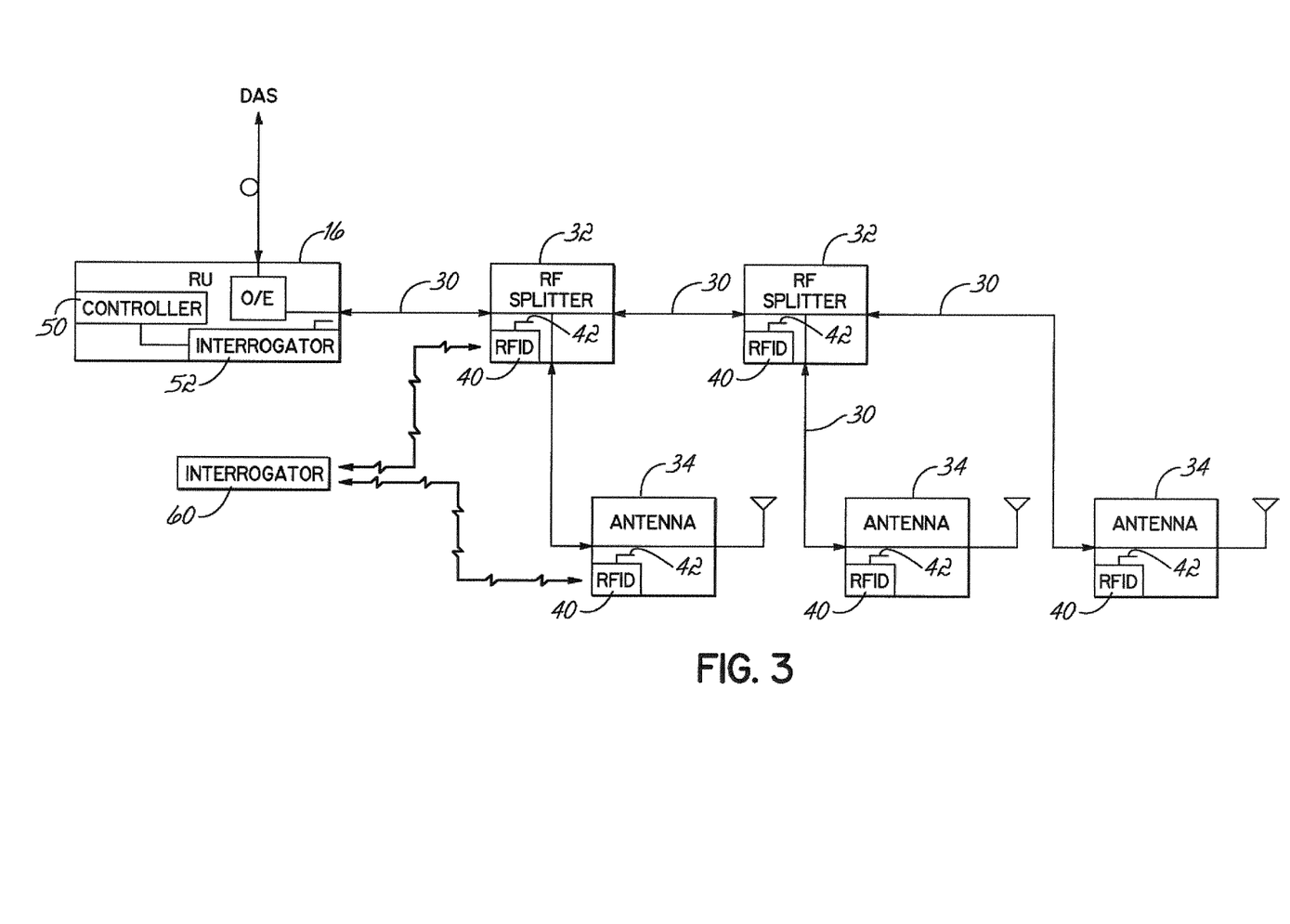
FIG. 3 is a block diagram of passive elements of a distributed antenna system consistent with another embodiment of the invention.

While FIG. 2 illustrates one embodiment of a remote antenna unit 12 implementing RFID systems in accordance with the invention, other implementations might utilize additional RF splitters 32, for example, in connecting the various antennas with the remote antenna unit. FIG. 3 illustrates a remote antenna unit 12 coupled with antennas 34 through multiple splitters 32. Each splitter 32 incorporates an RFID system in accordance with the invention.

In accordance with one embodiment of the invention, the interrogator is incorporated into a component of the DAS, such as the remote antenna unit 12, and coupled in line through a waveguide, such as coaxial cable 30. Alternatively, as discussed herein, the interrogator might be a free standing or mobile interrogator, such as unit 60 illustrated in FIGS. 2 and 3.

Figure 4:
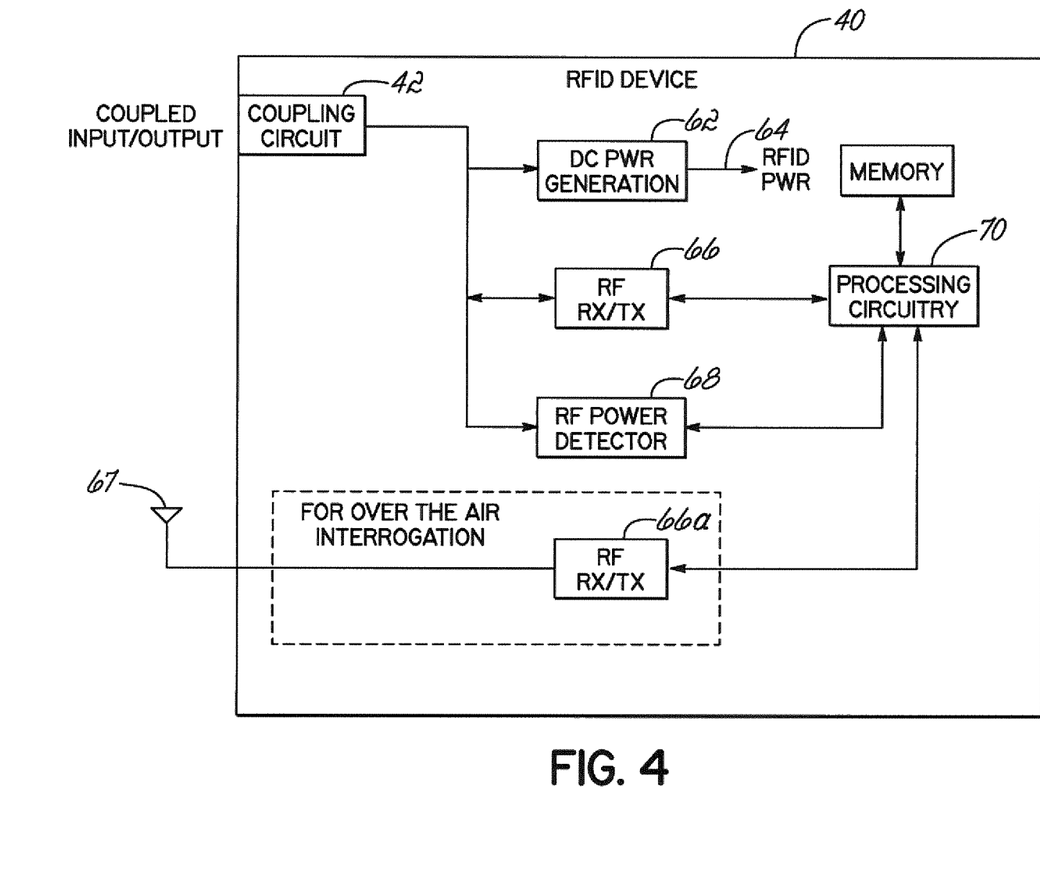
FIG. 4 is a block diagram of an RFID system for incorporation with passive elements of a distributed antenna system consistent with embodiments of the invention.

FIG. 4 illustrates a block diagram of an RFID system in accordance with an embodiment of the invention. As noted, the RFID system has features of a typical RFID device with respect to a unique identifier or serial number that identifies which RFID system has answered or provided a return signal to an interrogation signal from an RFID reader or interrogator. The RFID system of the invention, in addition to the ID features, also incorporates processing circuitry and measurement circuitry for doing additional measurements and processing in the system. The measurement system is powered by the RFID chip and uses the interrogator signal for powering other elements and features of the system. The processing and measurement circuitry can either be integrated with an RFID device (typically a chip) into an RFID system, as illustrated in FIG. 4, or is connected and powered by the separate RFID device.

The RFID measurement system receives one or a sequence of interrogator signals and uses the energy of the interrogator signals to prepare a response. In accordance with one aspect of the invention, the RFID response would include typical unique ID information, but also includes measurement results obtained with the measurement system at the location of the RFID system. FIG. 4 shows an RFID system wherein the various components might be incorporated into a single chip or element for addressing the various features of the system in accordance with the invention. Alternatively, various elements such as the processing elements and measurement or detecting elements might be incorporated in a separate chip that is then powered by the separate RFID chip.

As shown in FIGS. 2 and 3, the interrogator transceiver 52 is located at the feed point of the passive DAS for collecting the measurement results from the various RFID systems 40, and to process, analyze, and make determinations of the layout (interconnectivity and location), the faultless function, the presence of nearby users or interference and other information relevant for the operation and maintenance of the passive DAS system.

To that end, referring to FIG. 4, an RFID system 40 incorporates an appropriate coupling circuit 42 for receiving a portion of an RFID interrogation signal. The system 40 includes a power generation circuit 62 that uses one or more RFID interrogation signals for providing suitable DC power 64 to other components/elements of the system 40. The RFID system 40 also includes suitable RF transceiver circuitry 66 for providing the necessary communication back and forth between the system 40 and an interrogator 52. The transceiver circuitry 66 might be wired to communicate through the coupling circuitry directly onto the coaxial cable 30 or other waveguide. Alternatively, for a mobile interrogator, the system might incorporate transceiver circuitry 66a for communication over the air in a wireless link. The transceiver circuitry 66a would be coupled to an appropriate antenna element 67 for the wireless link.

In accordance with one aspect of the invention, the RFID system 40 includes measurement circuitry 68 for measuring characteristics of an RF interrogator signal or other signal that is coupled to the system 40 through coupling circuitry 42. In one embodiment, the measurement circuitry 68 might include an RF power detector for detecting levels of the RF signals (interrogator signals or other RF signals) that are captured by the system 40 through the coupling circuitry 42. System 40 also incorporates processing circuitry 70, such as a processing unit or processor, that provides signal processing at the system 40 in accordance with features of the invention. The processing circuitry 70 is coupled with memory 72 for storing and accessing information, such as the unique 1D information of the system 40. The processing circuitry can be used to control various of the other elements of the system, such as the measurement circuitry 68 and transceiver circuitry 66.

In accordance with one feature of the invention, the RFID system can make a measurement of the level of signals received by the system and process that information and return it to the interrogator 52, such as to determine an amount of cable loss in the sections of the cable that might connect the passive elements to the interrogator 52. For example, referring to FIG. 2, the interrogator 52 might receive an RSSI measurement from the RFID system that is associated with an interrogation signal that was sent. The interrogation signal is sent from interrogator 52 of the remote antenna unit 16 and is received by the RFID system 40 associated with the RF splitter 32. The RFID system 40 couples off the RFID interrogation signal with the coupling circuit 42 and it is directed to appropriate measurement circuitry 68, such as a power detector. The RFID interrogation signal might also be used for providing suitable power 64 to power the processing circuitry and other elements of system 40.

The power detector 68 determines the level of the received interrogation signal (RSSI) and reports the measured level to the processing circuitry 70 that processes it to formulate a response. The response signal then returns suitable information, such as ID information (indicating which RFID system is responding) and measured RSSI power levels, to the interrogator 52. The transceiver circuitry 66 is used to provide the measured information as a response. The interrogator 52 has suitable processing circuitry for evaluating the level of the interrogation signal that was originally sent and the returned RSSI information from the RFID system response for determining the loss that occurred in the cable between the remote antenna unit and the RF splitter element, or other passive element where the RFID system 40 responds. The amount of cable loss might then be used to determine if there is a fault in the cable or some other issue with the cable connection. The coupling losses associated with the interrogator and the RFID system itself may be taken into account when determining the overall cable loss for coaxial cable 30 or other waveguide.

In accordance with another feature of the invention, the RFID system can be used for determining the transfer function (amplitude and phase at the frequency of the interrogation signal) between the DAS feed and a particular passive element with the RFID system. More specifically, an RF signal might be captured by the RFID system 40 of a passive element. The captured RF signal might be from the interrogator 52 or might be some other RF signal transmitted by the feeding system of the DAS. The information regarding the captured RF signal, such as a measured signal level of the RF signal, is then included in the RFID system response to the interrogator 52 for further processing by the processing circuitry of the interrogator. Through a comparison of the response with the original transmitted signal (either interrogation signal or other RF signal), the processing circuitry of the interrogator unit can determine the noted transfer function of the system at a frequency of interest.

In accordance with another feature of the invention, the interrogator processing system can determine the amount of delay that occurs between the transmission of the interrogation signal, such as from the remote antenna unit, and the reception of the response from the passive element RFID system and the processing circuitry of the RFID system. In evaluating that time difference or delta, the cable distance that exists in the coaxial cable 30 between the remote antenna unit feed and a passive element such as the RF splitter 32 might then be determined. The measured distance result might experience some error associated with the processing delay in the RFID system 40. To that end, the RFID system makes a determination of the processing time delay between receipt of the interrogation signal and the transmission time of the response generated from the RFID system. The processing circuitry 70 of the system 40 can use that processing delay information and provide that delay information in the response that is sent back to the interrogator 52.

For the purposes of determining the processing delay more accurately, in one embodiment, an interrogator might be used for sending a periodic probing signal and measuring the response delay of several responses. Then a min. hold function is used to determine the group delay between the interrogator and the RFID chip. For this measurement a high speed sampling technology at the interrogator for the response is required to capture the response waveform with the accuracy of nanoseconds. As a method to determine the delay the interrogator can correlate the received response from the RFID system with a stored response. From the position in time delay of the correlation peak, the group delay, and thus length to the RFID system, can be determined.

In accordance with another feature of the invention, the RFID system and the processing circuitry 70 and measurement circuitry 68 therein might be triggered by the interrogator to provide desired measurement and processing of signals present at the passive element associated with a particular RFID system 40. Upon receipt of a trigger signal from the interrogator 52, the RFID system 40 measures the RSSI of any present signal at the position of that RFID system (e.g., a particular passive DAS element). That present signal might be a downlink (DL) signal that was sent by the DAS feed, a DL signal received by the passive DAS system, or an uplink (UL) signal received by the antenna feeding the trunk. Upon being appropriately triggered, the RFID system 40 makes the necessary signal measurement and provides a response to the interrogator that includes the measured information, in addition to identification information associated with a specific passive element.

In another embodiment of the invention, other trigger mechanisms might be used by the RFID system 40 to take an RF measurement. For example, events that would trigger the measurement at the RFID system 40 can be time delay, RF signal level of any received signal at the RFID system measurement circuitry. Downlink signals of the DAS might be used, as well as uplink signals of a user that is located in the DAS coverage area. Alternatively, interference from a signal source that is only active for a certain period of time might be utilized as a trigger signal for the RFID system 40. The measurement circuitry and processing circuitry of the RFID system receive and evaluate the trigger signal and make desired measurements and then provide the desirable RF measurements and information in a response signal to the interrogator for further processing.

Utilizing the RFID system of the invention, measurements such as cable loss and cable distance may be determined. For each passive element, such as each antenna, various measurements might be made as disclosed herein to evaluate the operation of the element and the overall DAS system. This provides troubleshooting capabilities for the DAS and the passive elements therein. For example, the DAS may store suitable element parameters that are reflective of the elements at the time of commissioning the DAS. Any faults or degradation may be determined using the invention and appropriately alarmed for the DAS system administrator to address. For example, stored tables of loss parameters and distance values for all the elements in the passive DAS may be provided and, in combination with measured data from responses from RFID systems of the passive elements, may be used for verification and troubleshooting of those elements and the passive portions of the DAS installation.

In accordance with another aspect of the invention, the system responds only upon receiving several interrogation signals that would act as a trigger for making measurements or providing a response to an interrogator 52 from the RFID system 40. Specifically, several interrogation signals might be sent, either with a gap between the signals, or without a gap, and the RFID system and processing circuitry 70 would require a certain number of the interrogation signals in order to trigger an actual response from the RFID system. Utilizing several interrogation signals would improve the time synchronization of the RFID system, and provide higher accuracy between a received signal from the interrogator system, and the processing of the signal in the response of the RFID system. In that way, greater accuracy might be achieved in determining the processing time delay that is provided by the RFID system. As noted above, with greater accuracy in the processing delay, greater accuracy might be provided in determining the cable distance between two elements within the DAS.

In accordance with another aspect of the invention, the RFID system might determine the origin of uplink (UL) mobile traffic. In that regard, the RFID system utilizes a level-based trigger in order to respond. A response from the RFID system, including the unique identification information from the RFID system, provides a known position within the DAS. In that way, with the known position of the RFID system, the location of the traffic that triggered a response can be further narrowed down to a specific passive component, rather than just the entire DAS coverage area.

In accordance with another aspect of the invention, as illustrated in FIG. 2, an RF splitter 32 may have multiple antenna elements 34 connected thereto. In that regard, the RFID system 40 of the splitter might be coupled appropriately to each of the ports in order to either measure or capture the response of a connected RFID system of an antenna, for example, using the RF level as a trigger. The transmission of the response from an antenna RFID system, and its correlation to a specific input of the splitter can provide a determination of the specific splitter port where the antenna element is connected. Successively, all the interconnects to the splitter can be determined, documented, and used for trouble shooting. For example, an individual antenna element might respond with a message that includes information that it is an antenna that is responding. Similarly, a splitter port or other element might respond with similar information.

In accordance with another feature of the invention, as illustrated in FIG. 4, the RFID system may utilize a coupling circuit 42 for coupling off an interrogator signal or other RF signal. Alternatively, an antenna 67 and appropriate transceiver circuitry 66a might also be implemented. Therefore, the RFID system of a passive element can be coupled to a specific RF feed line or waveguide, or might be coupled directly to the air. This allows probing of the RFID system, with a portable interrogator, in addition to probing the RFID system with an interrogator 52 in a remote antenna unit, as illustrated in FIGS. 2 and 3. In some scenarios, it may be desirable to receive any response from an RFID system on air, even though the interrogation signal was sent through a waveguide.

For example, a portable interrogator or interrogating transceiver can be implemented in the area of passive elements of a DAS to determine the location of the various elements that are equipped with the RFID systems. By linking the position of the portable interrogator with the response received from the RFID system, the location of the passive element can be approximated. In that regard, adjusting the RF power of the interrogator transmitter to a lower value so as to only trigger closely-located elements, can improve the accuracy of the determination of the absolute location of the elements. Such location of the various elements may assist in making suitable measurements for evaluating any fault or degradation in DAS. In such a mobile interrogator scenario, the interrogation signal can be received by an over-the-air antenna 67 of the RFID system, or the interrogation signal might be sent through an antenna element 34 coupled to the remote antenna units. Any interrogation signal through antenna element 34 might then be coupled with the signal path by the coupling circuitry 42 of the RFID system 40, and processed accordingly to provide a response back to the interrogator.

A passive portion of a DAS can be as simple as an antenna feed in a point-to-point scenario, or a leaky feeder system, or may be a complex passive network consisting of various of the RF elements, as listed herein, such as RF and optical splitters and combiners, coaxial cables and other waveguides, and RF antennas. Therefore, the present invention is not limited to specific type of passive element within a DAS.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

EXAMPLE EMBODIMENTS

Example 1 includes a distributed antenna system comprising: a plurality of remote antenna units, a passive element coupled to at least one of the remote antenna units; an RFID system located proximate the passive element; and wherein the RFID system includes processing circuitry and measurement circuitry, the processing circuitry configured for receiving an interrogation signal and processing the interrogation signal and providing a response, the response including data associated with a measurement made by the measurement circuitry.

Example 2 includes the distributed antenna system of Example 1 further comprising an interrogator for providing the interrogation signal.

Example 3 includes the distributed antenna system of Example 2 wherein the interrogator is positioned proximate the remote antenna unit.

Example 4 includes the distributed antenna system of any of the Examples 1-3 wherein the response provided by the RFID system includes identification information associated with the passive element.

Example 5 includes the distributed antenna system of any of the Examples 1-4 wherein the RFID system is configured to receive an RF signal and to respond to RF signal with a response.

Example 6 includes the distributed antenna system of any of the Examples 1-5 wherein the measurement circuitry is configured for measuring a signal level of an RF signal received by the RFID system, the response including data associated with the measured signal level.

Example 7 includes the distributed antenna system of any of the Examples 1-6 further comprising at least one master unit communicatively coupled to the remote units.

Example 8 includes the distributed antenna system of Example 7 wherein the master unit is configured to convert downlink signals received from a base station or signal source into one or more digital data streams for transmission to the remote antenna units.

Example 9 includes a method for use with a distributed antenna system comprising a plurality of remote antenna units, the method comprising: receiving an interrogation signal at an RFID system of the distributed antenna system, the RFID system proximate a passive element coupled to at least one of the remote antennas of the distributed antenna system; making a measurement by the RFID system based on the interrogation signal; and providing, by the RFID system, a response including data associated with the measurement.

Example 10 includes the method of Example 9 wherein the distributed antenna system further comprises an interrogator configured to provide the interrogation signal.

Example 11 includes the method of Example 10 wherein the interrogator is positioned proximate the remote antenna unit.

Example 12 includes the method of any of the Examples 9-11 further comprising processing the interrogation signal to determine identification information associated with the passive element; and wherein the response provided by the RFID system includes identification information associated with the passive element.

Example 13 includes the method of any of the Examples 9-12 further comprising receiving an RF signal at the RFID system; and responding to the RF signal with a response.

Example 14 includes the method of any of the Examples 9-13 further comprising measuring, by the RFID system, a signal level of an RF signal received by the RFID system, the response including data associated with the measured signal level.

Example 15 includes the method of any of the Examples 9-14 wherein the distributed antenna system further comprises at least one master unit communicatively coupled to the remote units.

What is claimed is:

1. A distributed antenna system comprising:
    a plurality of remote antenna units, a passive element coupled to at least one of the remote antenna units;
    an RFID system located proximate the passive element; and
    wherein the RFID system includes processing circuitry and measurement circuitry, the processing circuitry configured for receiving an interrogation signal coupled onto a cable of the distributed antenna system, and processing the interrogation signal and providing a response, the response including data associated with a Radio Frequency (RF) signal parameter of the interrogation signal measurement made by the measurement circuitry.

2. The distributed antenna system of claim 1 further comprising an interrogator for providing the interrogation signal.

3. The distributed antenna system of claim 2 wherein the interrogator is positioned proximate the remote antenna unit.

4. The distributed antenna system of claim 1 wherein the response provided by the RFID system includes identification information associated with the passive element.

5. The distributed antenna system of claim 1 wherein the RFID system is configured to receive an RF signal and to respond to RF signal with a response.

6. The distributed antenna system of claim 1 wherein the measurement circuitry is configured for measuring a signal level of an RF signal received by the RFID system, the response including data associated with the measured signal level.

7. The distributed antenna system of claim 1 further comprising at least one master unit communicatively coupled to the remote units.

8. The distributed antenna system of claim 7 wherein the master unit is configured to convert downlink signals received from a base station or signal source into one or more digital data streams for transmission to the remote antenna units.

9. A method for use with a distributed antenna system comprising a plurality of remote antenna units, the method comprising:
    receiving an interrogation signal at an RFID system of the distributed antenna system, wherein the interrogation signal is coupled onto a cable of the distributed antenna system, the RFID system proximate a passive element coupled to at least one of the remote antennas of the distributed antenna system;
    making a Radio Frequency (RF) signal parameter measurement by the RFID system based on the interrogation signal; and
    providing, by the RFID system, a response including data associated with the measurement RF signal parameter.

10. The method of claim 9 wherein the distributed antenna system further comprises an interrogator configured to provide the interrogation signal.

11. The method of claim 10 wherein the interrogator is positioned proximate the remote antenna unit.

12. The method of claim 9 further comprising processing the interrogation signal to determine identification information associated with the passive element; and
    wherein the response provided by the RFID system includes identification information associated with the passive element.

13. The method of claim 9 further comprising receiving an RF signal at the RFID system; and responding to the RF signal with a response.

14. The method of claim 9 further comprising measuring, by the RFID system, a signal level of an RF signal received by the RFID system, the response including data associated with the measured signal level.

15. The method of claim 9 wherein the distributed antenna system further comprises at least one master unit communicatively coupled to the remote units.

* * * * *